UNITED STATES PATENT OFFICE.

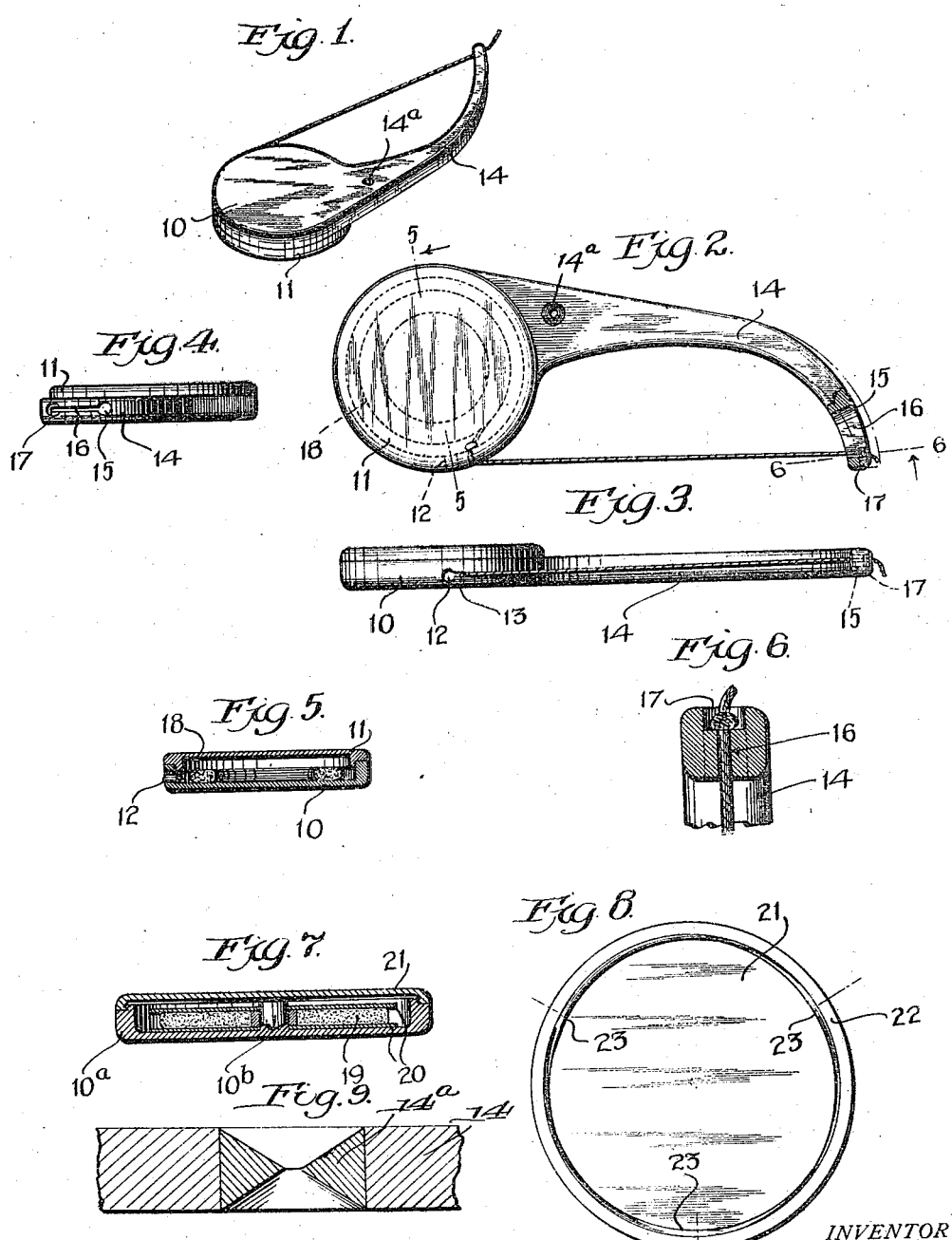

FREDERIC ECAUBERT, OF NEW YORK, N. Y.

DENTAL-FLOSS DEVICE.

1,268,944.  Specification of Letters Patent.  Patented June 11, 1918.

Application filed January 3, 1914.  Serial No. 810,148.

*To all whom it may concern:*

Be it known that I, FREDERIC ECAUBERT, a citizen of the United States, residing in the borough of Manhattan, city, county, and State of New York, have invented certain new and useful Improvements in Dental-Floss Devices, of which the following is a full and clear specification.

My invention relates first to a receptacle for dental floss by which the dental floss may be suspended under tension for use.

The objects of my invention are first to provide a cheap, practical and sanitary device for holding dental floss.

The dental floss receptacle comprises in general a case for a coil of dental floss, having a projecting resilient arm with suitable curvature, perforated at its outer end to receive and retain an enlargement or projection of the dental floss and hold the same under tension between it and the main case.

The invention is illustrated in the accompanying drawing, in which—

Figure 1 is a perspective view of the dental floss receptacle;

Fig. 2 is a top plan view of the same;

Fig. 3 is a side elevation of the same;

Fig. 4 is an end elevation of the same;

Fig. 5 is a vertical transverse section of the case;

Fig. 6 is a detail sectional elevation of the perforated end of the resilient arm;

Fig. 7 is a transverse vertical section of a case containing a reel for the dental floss;

Fig. 8 is a face view of the inside of the back;

Fig. 9 is a cross section of a cutter employed.

Referring more specifically to said drawing, 10 is the case which is provided with a cover 11 and has a perforation 12, from which leads a slot 13. A resilient arm 14 projects from the case 10 and has its outer end suitably curved and provided with a perforation 15 (see Fig. 4) from which leads a slot 16 terminating in a countersink or depression 17 (see Fig. 6). The parts thus far described may be constructed of any suitable elastic material, such as metal, celluloid and the like. An annular double concave cutter $14^a$ is embedded beneath the surface of arm 14 and through this cutter the dental floss is passed for cutting off the used portion. Cutting is effected by pulling the floss against the circular cutting edge. The dental floss is represented in Fig. 5, as comprising a coil 18, which may be compressed with wax, whereas in Fig. 7 the dental floss is represented as a coil 19 wound upon a reel 20. As shown in Fig. 7 the case $10^a$ has a post $10^b$ forming an arbor for the reel 20 and extending almost to the cover 21 for firmly supporting the same at the center against collapse while permitting perfect closure of the case. This post $10^b$ may be integral with, or suitably secured to the body of the case $10^a$. The dental floss is knotted at regular intervals, or otherwise provided with enlargements or projections, and drawn through the perforation 12 until the enlargement passes through, whereupon it is moved through the recess 13 until a knot, or enlargement, is reached, and the inner end of the length thus drawn out is arrested against the wall of the slot. The knots or enlargements are so spaced that a knot on the outer end can just pass through the perforation 15 of the arm 14, whereupon the outer end of the dental floss is pulled over the slotted portion 16 of the arm 14, causing the arm to yield inwardly until the end drops into the countersink or recess 17, whereby the dental floss is then retained under tension. The bottom of the recess 17 is preferably flat, as illustrated in Fig. 6, and the sides are preferably straight, so that the knot has no tendency to be crowded through the end of the slot 16, and it can not escape from the depression when a transverse strain is exerted upon the portion stretched between the case and the outer end of the arm. It will be obvious that the arm 14 may be either curved so as to permit the knot of the dental floss to pass through the perforation 15 without bending the arm, or the arm may be so constructed that it requires manual bending to permit the knot to reach the outer walls of slot 16. In any case, however, it is essential to my invention that the dental floss is held under tension between the arm 14 and the case 10 and preferably this tension is maintained by the arm 14. For this reason the outer end of recess 16 is farther from recess 13 than the inner end is, as shown clearly in Fig. 2.

A cover or back 11 is illustrated in Fig. 5 as being merely an ordinary snap cover. I may employ in place of the snap cover a screw cover, as illustrated in Figs. 7 and 8, in conjunction with a correspondingly threaded base.

The screw cover herein illustrated is applicable to many uses other than as a cover for dental floss cases. Referring to Fig. 8, 21 indicates a back having the annular flange 22 forming the side wall, and in this side wall are formed plural threads 23. As herein shown the plural threads are in the form of triple threads, the entrance to the several threads being spaced equally apart upon the circumference or in the present case 120° apart. A threading of this character is especially important in shallow covers, such as watch case backs, where the space for threading is seriously limited. In such instances where one thread only is employed the watch case back, for example, is not centered and secured on all sides until a complete turn has been made. Consequently when a shallow cover of this type, where space for but few turns is available, the securing of the back to the case is correspondingly weak and imperfect. By employing, for example, three independent threads, as herein shown, spaced apart equal distances about the circumference, one-third of a turn completely centers and firmly secures the back to the case. Furthermore, the centering is easier found and the seating is more accurate. It is unnecessary in many cases that the individual thread extend beyond the entrance to the succeeding thread, but it may, if desired, extend to the termination of the above space and thus offer additional security and strength.

It will be observed from the examples of my invention herein shown that I prefer to construct the case and arm in the same plane and with the axis of the coil of dental floss relatively short and disposed at right angle to the plane of the case and arm, so that all portions of the dental floss are substantially in one plane and the coil rotates in this plane. In this way I am enabled to gain the desired capacity of the coil by increase in the diameter of the case and coil, so as to keep the dimension of the case and arm in a direction at right angle to the plane thereof relatively small and thus produce an article which is conveniently inserted and carried in the pocket, while at the same time being convenient to hold between the fingers for use.

I claim:

1. A dental floss device comprising in combination a supply of dental floss subdivided into a continuous series of predetermined lengths, a case for containing the same, said case having a peripheral hole through which the supply of dental floss may be withdrawn, and a resilient arm for holding one of said predetermined lengths of dental floss extended under tension, the normal distance from the outer end of said arm to said peripheral hole being slightly greater than one of said lengths.

2. A dental floss device comprising in combination a case having a perforation with a communicating slot of smaller cross section, means extending therefrom having a perforation with a communicating slot of smaller cross section located at a distance from said case, and a supply of dental floss having enlargements capable of passing through said perforations but not capable of passing through said slots.

3. A dental floss receptacle comprising in combination a case for a supply of dental floss, a projecting arm for holding a projected length of dental floss under tension, and an annular cutter disposed entirely within the body of the receptacle for cutting the dental floss.

4. A dental floss device comprising in combination a case, a supply of dental floss disposed therein with enlargements at predetermined intervals, and an arm projecting from said case; said case having an outlet permitting the withdrawal of a length of dental floss predetermined by said enlargements, and said arm having a recess extending from a point relatively nearer to said outlet to a point more remote therefrom and adapted to permit the passage of said enlargement at said nearer point, while preventing such passage throughout the remainder of its length, said nearer distance being approximately equal to one of said predetermined lengths of dental floss, whereby said arm and projected length of dental floss are placed under tension, by sliding one of said enlargements of the dental floss from the nearer to the farther end of said slot.

5. A dental floss device comprising in combination a case, a supply of dental floss disposed therein with enlargements at predetermined intervals, and an arm projecting from said case; said case having an outlet permitting the withdrawal of a length of dental floss predetermined by said enlargements, and said arm having a recess extending from a point relatively nearer to said outlet to a point more remote therefrom and adapted to permit the passage of said enlargement at said nearer point, while preventing such passage throughout the remainder of its length, said nearer distance being approximately equal to one of said predetermined lengths of dental floss, whereby said arm and projected length of dental floss are placed under tension, by sliding one of said enlargements of the dental floss from the said recess having a depression at its remote end for retaining said enlargement of the dental floss.

FREDERIC ECAUBERT.

Witnesses:
 WM. A. COURTLAND,
 OCTAVIUS KNIGHT.

Copies of this patent may be obtained for five cents each, by addressing the "Commissioner of Patents, Washington, D. C."